US011940132B2

(12) United States Patent
Doresky et al.

(10) Patent No.: US 11,940,132 B2
(45) Date of Patent: Mar. 26, 2024

(54) LIGHT ASSEMBLY WITH A SUSPENSION ASSEMBLY

(71) Applicant: Hunter Fan Company, Memphis, TN (US)

(72) Inventors: Jack Doresky, Memphis, TN (US); Douglas Troy Mason, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 17/825,010

(22) Filed: May 26, 2022

(65) Prior Publication Data

US 2023/0383931 A1 Nov. 30, 2023

(51) Int. Cl.
*F21V 21/03* (2006.01)
*F21V 21/008* (2006.01)
*F21V 17/12* (2006.01)

(52) U.S. Cl.
CPC ............ *F21V 21/03* (2013.01); *F21V 21/008* (2013.01); *F21V 17/12* (2013.01)

(58) Field of Classification Search
CPC ......... F21V 21/03; F21V 21/008; F21V 17/12
See application file for complete search history.

(56) References Cited

U.S. PATENT DOCUMENTS 1,297,211 A 3/1919 Magness
4,303,968 A 12/1981 Goralnik
4,448,388 A 5/1984 Dennis et al.
4,634,345 A * 1/1987 Stanek .................... F24F 13/32 248/343
5,613,832 A * 3/1997 Su ......................... F04D 29/646 416/61
6,116,559 A 9/2000 Lackey
6,139,279 A * 10/2000 Pearce .................. F04D 25/088 416/244 R
6,171,062 B1 1/2001 Bucher et al.
6,598,846 B1 * 7/2003 Lackey, Jr. ........... F04D 29/601 248/343
6,932,578 B2 * 8/2005 Pearce .................. F04D 29/601 416/246
7,080,813 B1 7/2006 Frampton et al.
2004/0062656 A1 * 4/2004 Marshall ............... F04D 25/088 416/244 R (Continued)

FOREIGN PATENT DOCUMENTS

| | | | |
|---|---|---|---|
| CN | 203867995 | U | 10/2014 |
| EP | 2642195 | A1 | 9/2013 |
| WO | 2002001110 | A1 | 1/2002 |

OTHER PUBLICATIONS

Lowes, “Portfolio Silver Metal Ceiling Light Mount”, https://www.lowes.com/pd/Portfolio-Silver-Metal-Ceiling-Light-Mount/3659582, accessed Feb. 25, 2022, 2 pages, US.

*Primary Examiner* — Leah Simone Macchiarolo
(74) *Attorney, Agent, or Firm* — McGarry Bair PC

(57) ABSTRACT

A light can be suspended from a structure to illuminate a space. The light can mount to the structure with a hanger bracket including a seat. A ball mount coupled to a downrod can be received within the seat to suspend the downrod. An open mouth in the hanger bracket permits insertion of the downrod to facilitate installation. A canopy can fasten to the hanger bracket to suspend the canopy from the structure via the downrod.

26 Claims, 6 Drawing Sheets

(56) References Cited

U.S. PATENT DOCUMENTS

| | | | | |
|---|---|---|---|---|
| 2004/0256531 | A1 | 12/2004 | Tang | |
| 2008/0181783 | A1* | 7/2008 | Pearce | F04D 25/088<br>416/244 R |
| 2021/0048041 | A1 | 2/2021 | Gorali | |

* cited by examiner

LIGHT ASSEMBLY WITH A SUSPENSION ASSEMBLY

FIELD OF INVENTION

This application is directed to a light assembly, and more specifically, to a mounting assembly for the light assembly.

BACKGROUND

Lights can be suspended from a ceiling or structure, such as in residential or commercial applications for illuminating a space or object.

BRIEF DESCRIPTION

In one aspect, the disclosure relates to a light assembly suspended from a structure to illuminate a space, the light assembly comprising: a ball mount; a hanger bracket having a seat shaped to seat the ball mount, and the hanger bracket having an open mouth opening to the seat; a downrod including a first end coupled to the ball mount; and a light coupled to the downrod opposite of the first end; wherein the downrod includes a diameter that is less than that of the open mouth to permit seating of the ball mount in the seat by passing the downrod through the open mouth.

In another aspect, the disclosure relates to a light suspension assembly for suspending a light from a structure to illuminate a space, the light suspension assembly comprising: a ball mount having a threaded opening; a hanger bracket having a seat for seating the ball mount, and the hanger bracket having an open mouth opening to the seat; a downrod including a threaded end for coupling to the threaded opening of the ball mount; and wherein the downrod includes a diameter that is less than that of the open mouth.

In another aspect, the disclosure relates to a kit for suspending a light from a structure, the kit comprising: a ball mount; a hanger bracket having a seat shaped to seat the ball mount, and the hanger bracket having an open mouth opening to the seat; and a downrod including a first end coupled to the ball mount, wherein the downrod includes a diameter that is less than that of the open mouth to permit seating of the ball mount in the seat by passing the downrod through the open mouth.

DETAILED DESCRIPTION

Figure 1:
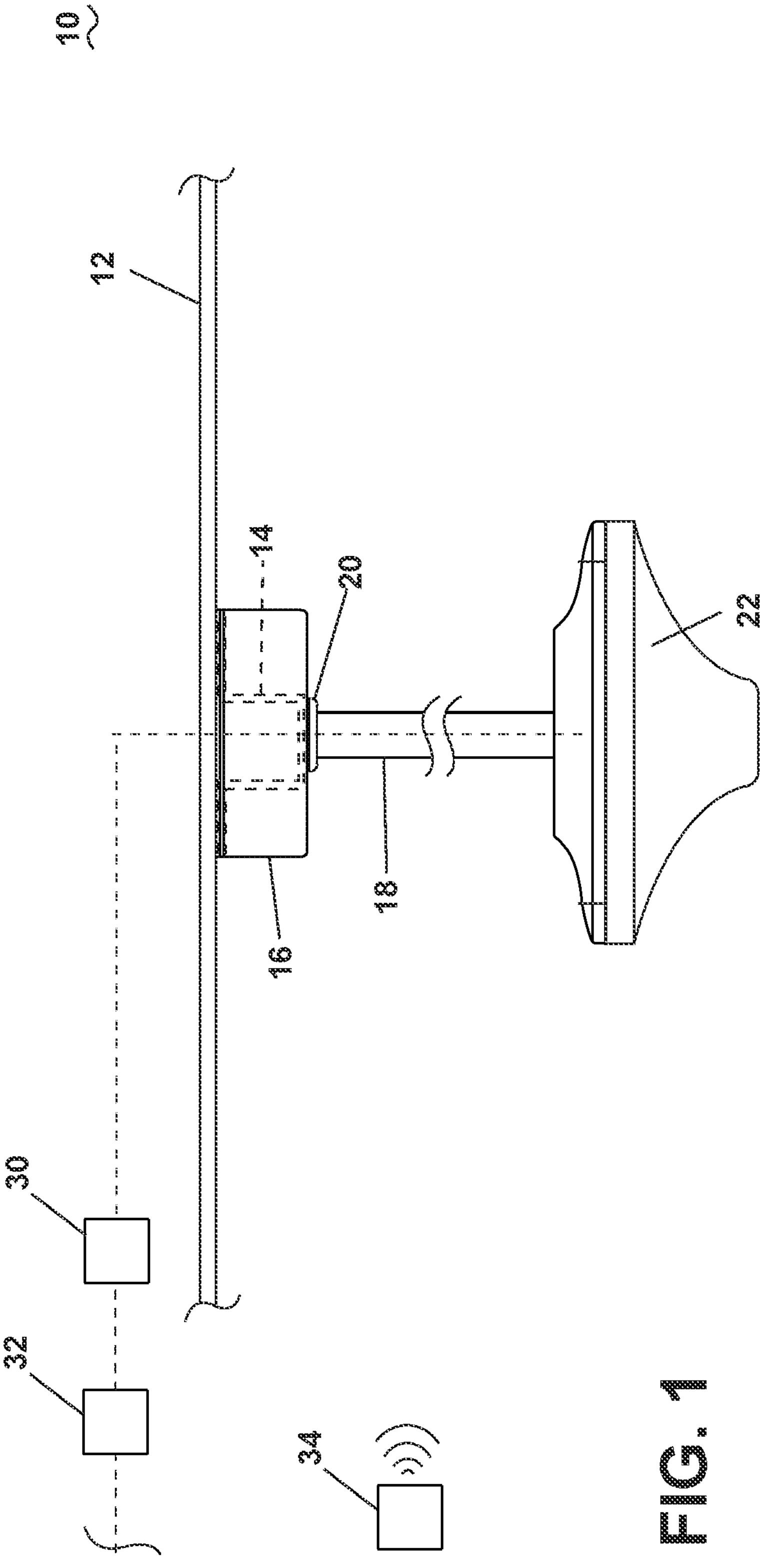
FIG. 1 is a schematic view of a light suspended from a structure.

The disclosure is related to a light and a mounting assembly therefore, which can be used, for example, in residential and commercial applications. Such applications can be indoors, outdoors, or both. While this description is primarily directed toward a residential light, it is also applicable to any environment requiring or utilizing suspended lighting about a space.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a light assembly 10 is suspended from a structure 12. In non-limiting examples, the light assembly 10 can include one or more light components including, but not limited to, a hanger bracket 14, canopy 16, a downrod 18, a ball mount 20, and a light 22. The structure 12 can be a ceiling, for example, from which the light assembly 10 is suspended. It should be understood that the structure 12 is schematically shown and is by way of example only, and can include any suitable building, structure, home, business, or other environment wherein illuminating a space is suitable or desirable.

An electrical supply 30 can supply power to the light assembly 10. A controller 32 can be electrically coupled to the electrical supply 30 to control operation of the light assembly 10, such as a wall-mounted switch coupled to the electrical supply 30. Alternatively, another controller can be wirelessly or communicatively coupled to the light assembly 10, configured to control operation of the light assembly 10 remotely. Non-limiting examples of controls for the light assembly 10 can include on, off, dim, color, timer, or other light settings. Furthermore, the wireless controller 34 can be used alone or in addition to the wired controller 32, and can be communicatively coupled to a controller or a wireless receiver in the light assembly 10 to control operation of the light assembly 10. It is further contemplated, in one alternative example, that the light assembly 10 be operated by the wireless controller 34 alone, and is not operably coupled with the wired controller 32. Non-limiting examples of a wireless controller 34 can include a light remote control, a smart device like a smart phone or computer, or via wireless network.

Figure 2:
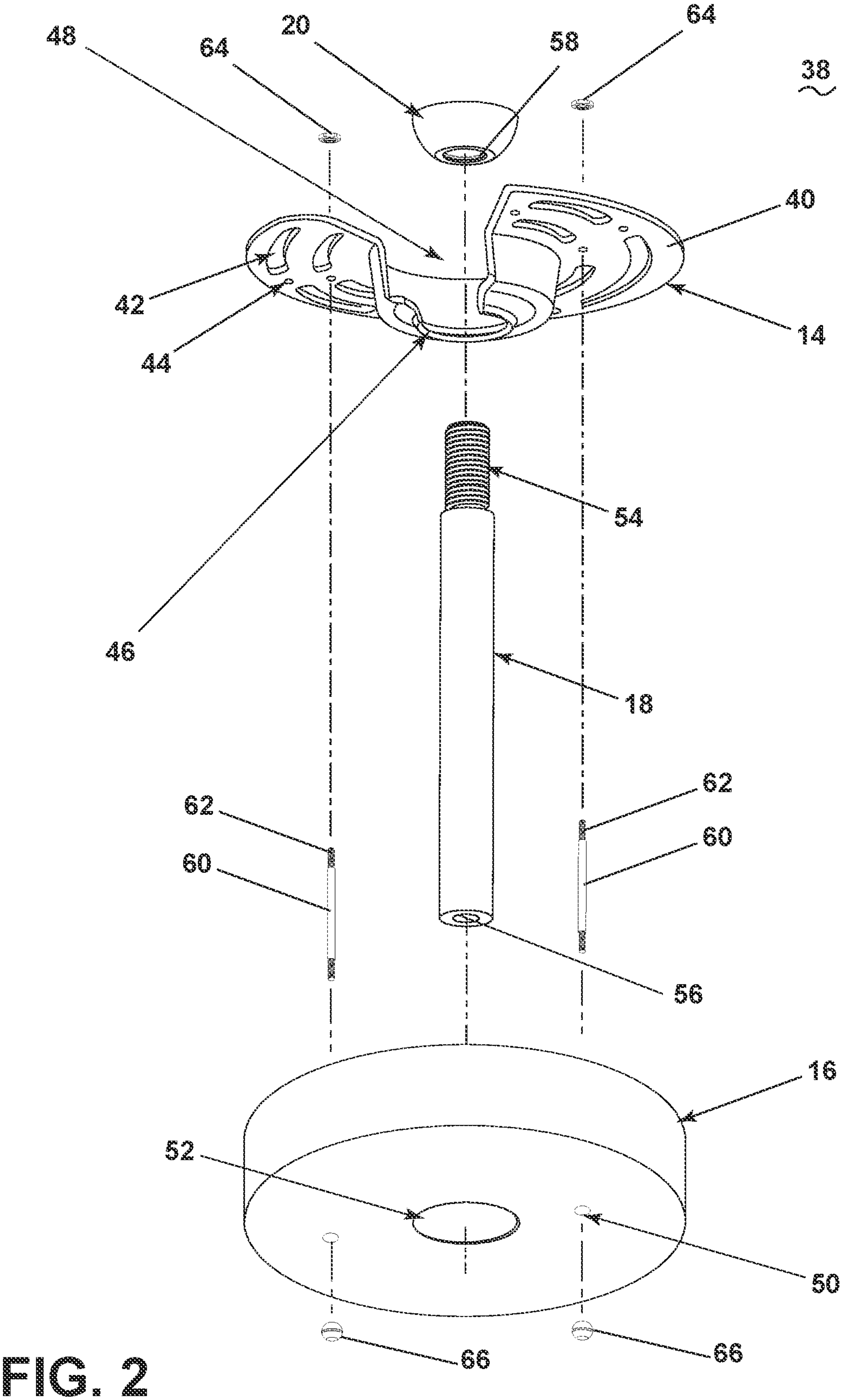
FIG. 2 is an exploded view of the light of FIG. 1, including a canopy and a hanger bracket.

Referring to FIG. 2, a mounting assembly 38 can include the hanger bracket 14, the canopy 16, the downrod 18, and the ball mount 20. The hanger bracket 14 includes a top plate 40 with a set of mount openings 42 and a set of fastener openings 44. The mount openings 42 can be used to mount the hanger bracket 14 to the structure, and the fastener openings 44 can be used to mount the canopy 16 to the hanger bracket 14. A seat 46 extends from the top plate 40 and includes an open mouth 48. The seat 46 can be shaped to receive the ball mount 20. The open mouth 48 can be sized to receive the downrod 18, while also shaped to prevent the ball mount 20 from moving from the seat 46.

The canopy 16 includes a pair of fastener holes 50, which can be provided on opposing sides of a central opening 52. The central opening 52 can be sized to receive the downrod 18 or a portion of the ball mount 20. The downrod 18 can include a threaded end 54 and a hollow interior 56. The ball mount 20 can include a threaded opening 58 adapted to threadably couple to the downrod 18 at the threaded end 54.

During assembly, the hanger bracket 14 can fasten to the ceiling or structure from which the light is to be suspended. In one example, fasteners, such as screws, can be used to secure the hanger bracket 14 to the structure through the mount openings 42, while other suitable mount methods are contemplated. The ball mount 20 attaches to the downrod 18 by threading the threaded end 54 to the threaded opening 58. The ball mount 20 can then be seated in the seat 46. Seating of the ball mount 20 can include inserting the downrod 18 through the open mouth 48 and positioning the ball mount 20 into the seat 46 such that the downrod 18 extends below the seat 46. In this way, the downrod 18 can have a diameter that is less than the width of the open mouth 48.

The canopy 16 can be slid along the downrod 18 to mount to the hanger bracket 14. More specifically, the downrod 18 can insert through the central opening 52, and the canopy 16 can slide along the downrod 18 until the central opening 52 meets the ball mount 20. Fasteners 60 can be used to secure the canopy 16 to the hanger bracket 14 to hide the mounting assembly with the canopy 16. The fasteners 60 can have opposing threaded ends 62, while any suitable attachment method is contemplated. A set of nuts 64 or other fasteners can be used to threadably secure the fasteners 60 to the hanger bracket 14, and a set of threaded caps 66 can thread to the other threaded ends 62 passing through the fastener holes 50, thereby securing the canopy 16 to the hanger bracket 14. In an example where the fasteners 60 are screws, the caps 66 can be decorative to cover the screws after attachment of the canopy 16 to the hanger bracket 14.

This mounting system described herein provides for a simplified user installation experience. The simplified installation system provides for threading the ball mount 20 to the downrod 18, and positioning the ball mount 20 within the seat 46 by passing the downrod 18 through the open mouth 48. The fasteners 60 can be secured to the hanger bracket 14 with the nuts 64. The user can slide the canopy 16 along the downrod 18 and secure the canopy 16 to the hanger bracket 14 by aligning the fasteners 60 with the fastener holes 50, and using the caps 66 to thread to the fasteners 60. The canopy 16 can then rest on the caps 66, covering the hanger bracket 14, the seat 46, and at least a portion of the ball mount 20.

The mounting system provides for an improved user installation experience, facilitating installation. The open mouth 48 provides a simplified installation for the downrod 18 via the ball mount 20, permitting the user to attach the ball mount 20 to the downrod 18 prior to seating in the seat 46, which permits easy mounting of the downrod 18 to the hanger bracket 14. Furthermore, the assembly is simplified, reducing overall manufacture parts and costs.

It should be further appreciated that the hanger bracket 14 is primarily ornamental, and was created for the purpose of ornamenting, and the ornamental design thereof included significant decisions about how to present the hanger bracket 14 in the marketplace. While the hanger bracket 14 is intended to be hidden during its ultimate end use, the ornamental design is clearly intended to be noticed during the process of sale and noticed during installation of the hanger bracket 14. Such ornamenting provides that the article's design is a matter of concern, such as for as developing consumer recognition during the process of sale or during installation of the light including the hanger bracket 14, as well as enhancing saleable value and increasing consumer demand. Such ornamentality can be defined by one or more of the shape of the bracket, the pattern of openings, and the shape of the seat therein, as they contribute to the ornamental design as a whole.

Figure 3:
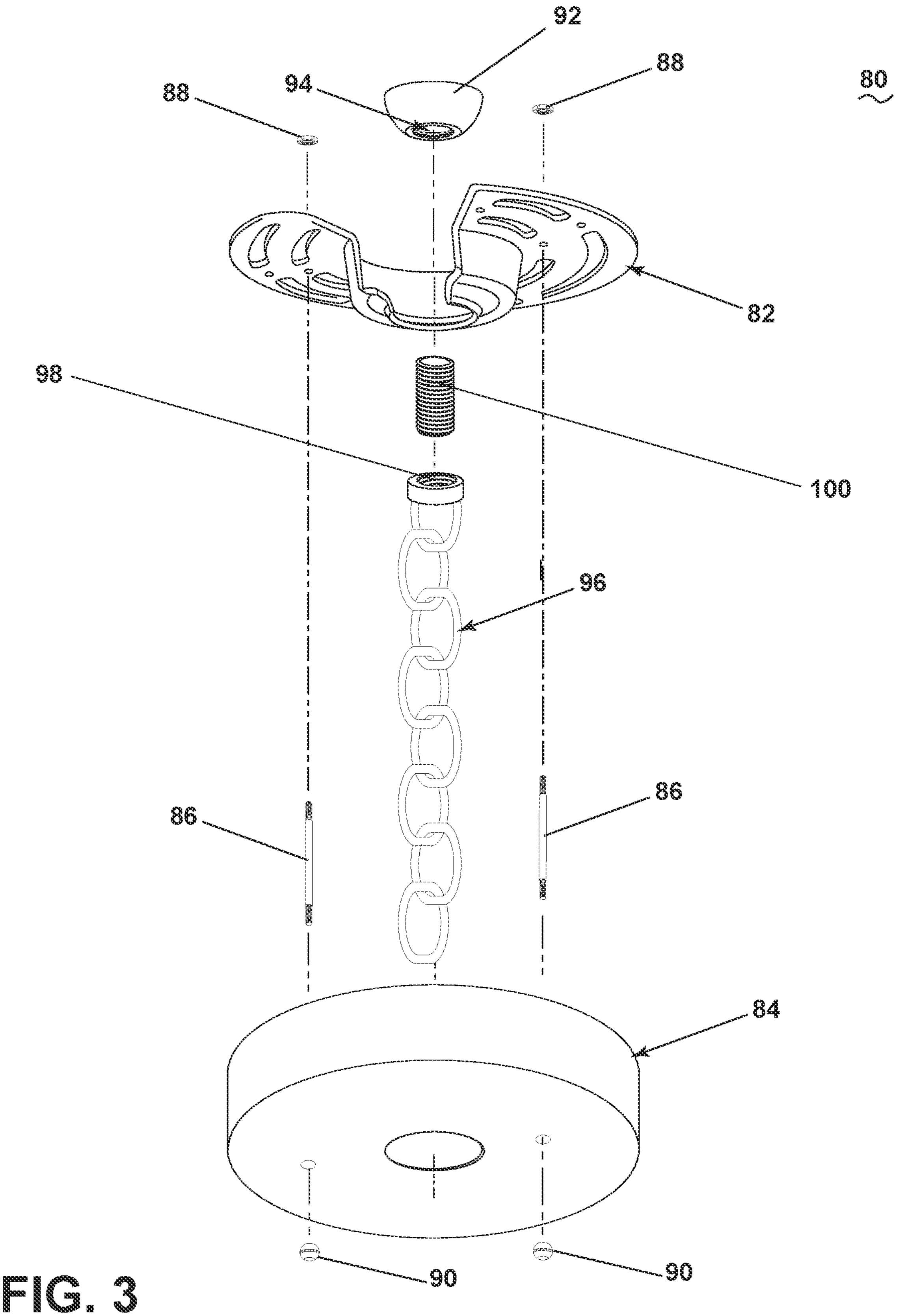
FIG. 3 is a view of an alternative light, including a chain-type suspension system.

Referring to FIG. 3, an alternate suspension assembly 80 can be substantially similar to that of FIG. 2, including a hanger bracket 82, a canopy 84, fasteners 86, nuts 88, and caps 90 which are substantially similar or the same as the hanger bracket 14, the canopy 16, the fasteners 60, the nuts 64, and the caps 66 of FIG. 2, respectively. A ball mount 92 can include a threaded opening 94. Additionally, it is contemplated that the ball mount 92 is hollow, permitting wiring to pass through to electrically couple to the light.

A suspension element is provided as a chain 96 for suspending a light element from the hanger bracket 82. The chain 96 can couple to or be formed integrally with a threaded receptacle 98. A threaded connector 100 can be used to connect the ball mount 92 to the chain 96 by fastening the threaded connector 100 to the threaded opening 94 and the threaded receptacle 98. Additionally, it is contemplated that an electrical supply can be provide to the chain 96 this way, permitting the chain to electrically supply the light without a separate electrical connection or wiring. The assembly utilizing the threaded connector 100 provides a simplified assembly system, requiring less parts and facilitating installation, which improves the user installation experience.

In an alternative example, the ball mount can include a first electrical connector and a second electrical connector can be provided on the chain 96, such as a male and a female side of a complete connection, permitting plug-in attachment of the chain 96 to the ball mount 92 via the first and second electrical connectors.

Figure 4:
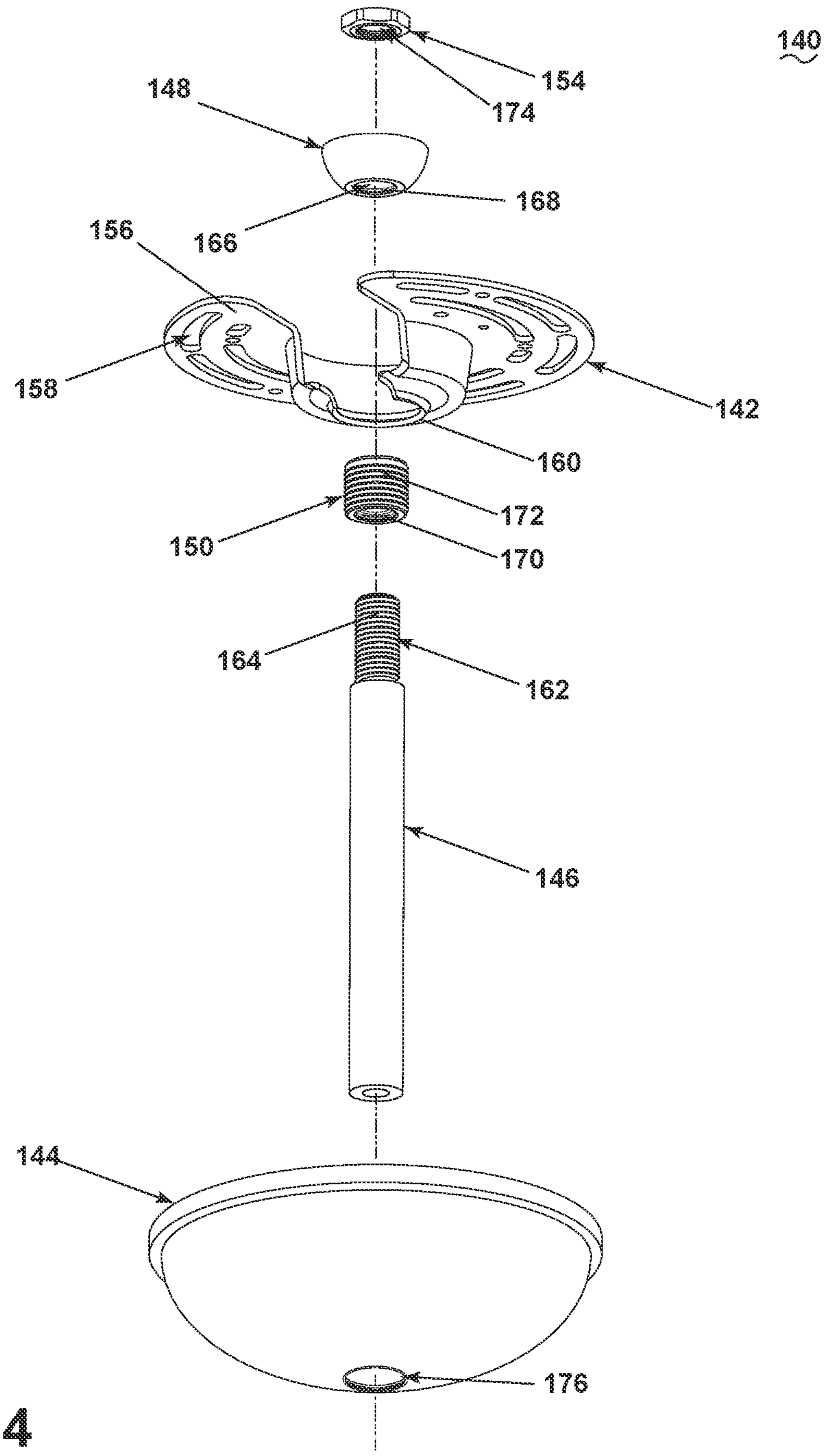
FIG. 4 is an exploded view of the light of FIG. 1 including a suspension assembly.

Referring to FIG. 4, a mounting assembly 140 provides for suspending a light assembly from a structure includes a hanger bracket 142, a canopy 144, a downrod 146, a ball mount 148, and a canopy fastener 150. The canopy 144 includes a canopy opening 176 for at least partially covering the mounting assembly 140. The hanger bracket 142 includes a mounting portion 156 with a set of openings 158 for mounting to a structure. The hanger bracket 142 also includes a seat 160 sized to receive the ball mount 148. The downrod 146 includes a first end 162 with a threaded portion 164. The ball mount 148 can include an interior opening 166 that includes a threaded surface 168 sized to thread to the threaded portion 164 of the downrod 146.

The canopy fastener 150 can be a hollow cylinder, having threads on both an interior surface 170 and an exterior surface 172. The interior surface 170 can be sized to thread to the threaded portion 164 of the downrod 146. The downrod fastener 154 can include a threaded center opening 174, similar to that of a nut, also sized to thread to the threaded portion 164 of the downrod 146. The canopy 144 can include a canopy opening 176 that is threaded and sized to thread to the exterior surface 172 of the canopy fastener 150.

Assembly of the mounting assembly 140 includes threading the canopy fastener 150 about the threaded portion 164 of the downrod 146. The ball mount 148 can thread onto the threaded portion 164 behind the canopy fastener 150, and the downrod fastener 154 can thread to the end of the threaded portion 164, securing the canopy fastener 150 and the ball mount 148 in serial arrangement. The ball mount 148 can seat within the seat 160 to suspend the downrod 146 from the hanger bracket 142. The canopy 144 can slide along the downrod 146, with the downrod 146 passing through the canopy opening 176, and thread to the exterior surface 172 of the canopy fastener 150, covering the hanger bracket 142. The canopy 144 can be threaded until it abuts the structure, and a frictional force between the canopy 144 and the structure can resist or prevent loosening of the canopy 144 from the canopy fastener 150.

Figure 5:
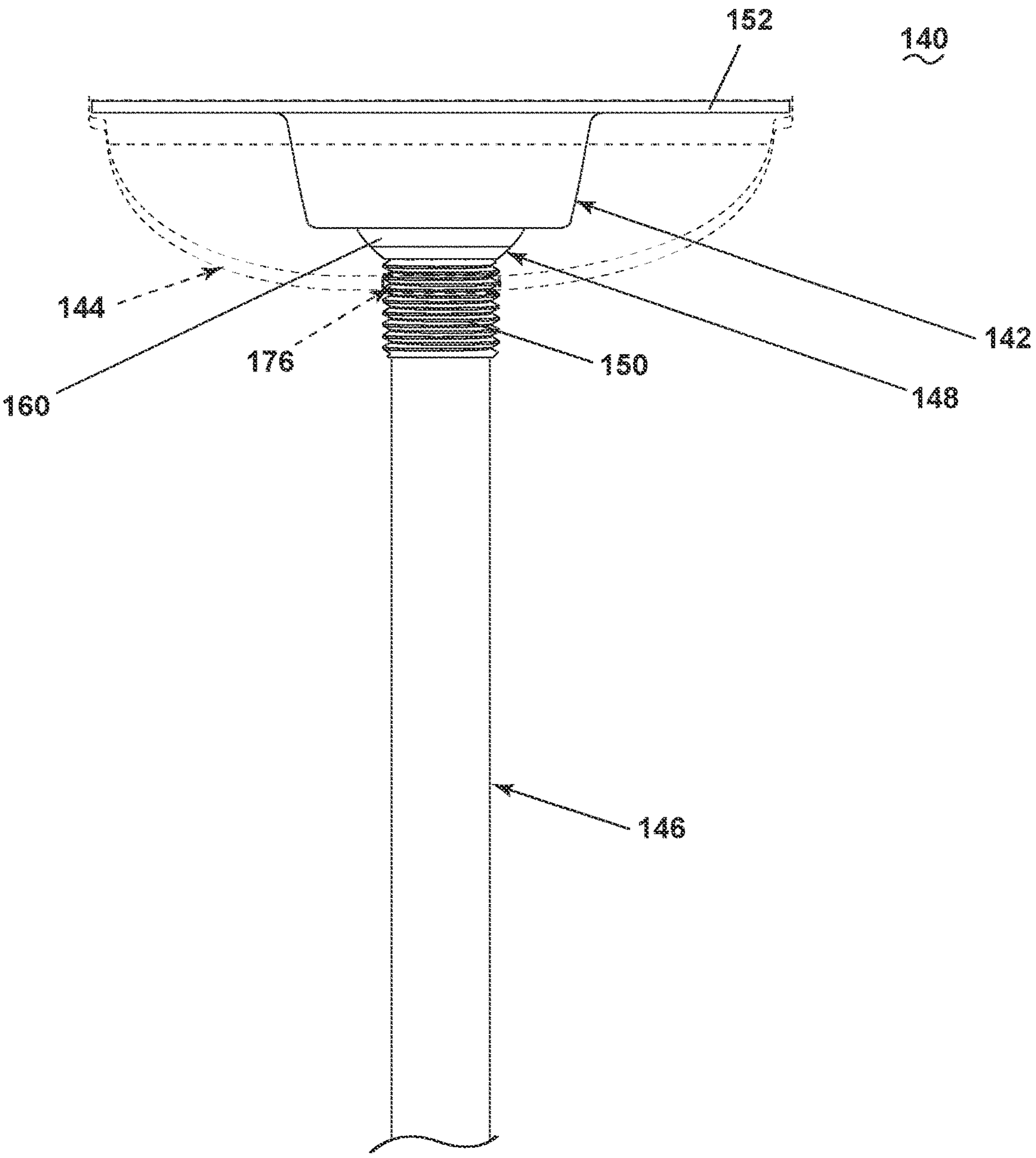
FIG. 5 shows the assembled suspension assembly of FIG. 2, with a canopy shown in broken line.

FIG. 5 shows the assembled mounting assembly 140, with the attached canopy 144 shown in broken lines. The canopy 144 threads to the canopy fastener 150 at the threaded canopy opening 176 until it abuts a structure 152. Thereafter, the remaining portions of the light assembly can be coupled to the remaining end of the downrod 146. The canopy 144 hides the hanger bracket 142, as well as at least a portion of the ball mount 148 and other portions of the mounting assembly 140, providing for a pleasant aesthetic after installation. A power connection, such as a power cable, can pass through the ball mount 148 and through downrod 146, hiding any electrical components from view.

The mounting assembly 140 provide improved ease of installation for a user. A user can mount the hanger bracket 142 to the structure 152, and can then thread the canopy fastener 150, the ball mount 148, and the downrod fastener 154 (hidden within the ball mount 148 in FIG. 5), and then easily hang and seat the ball mount 148 within the seat 160. The user then only needs to slide the canopy 144 along the downrod 146 through the canopy opening 176, and spin or rotate the canopy 144 to thread the canopy 144 to the canopy fastener 150. This improves the installation experience for the user, and provides for improved ease of installation.

Figure 6:
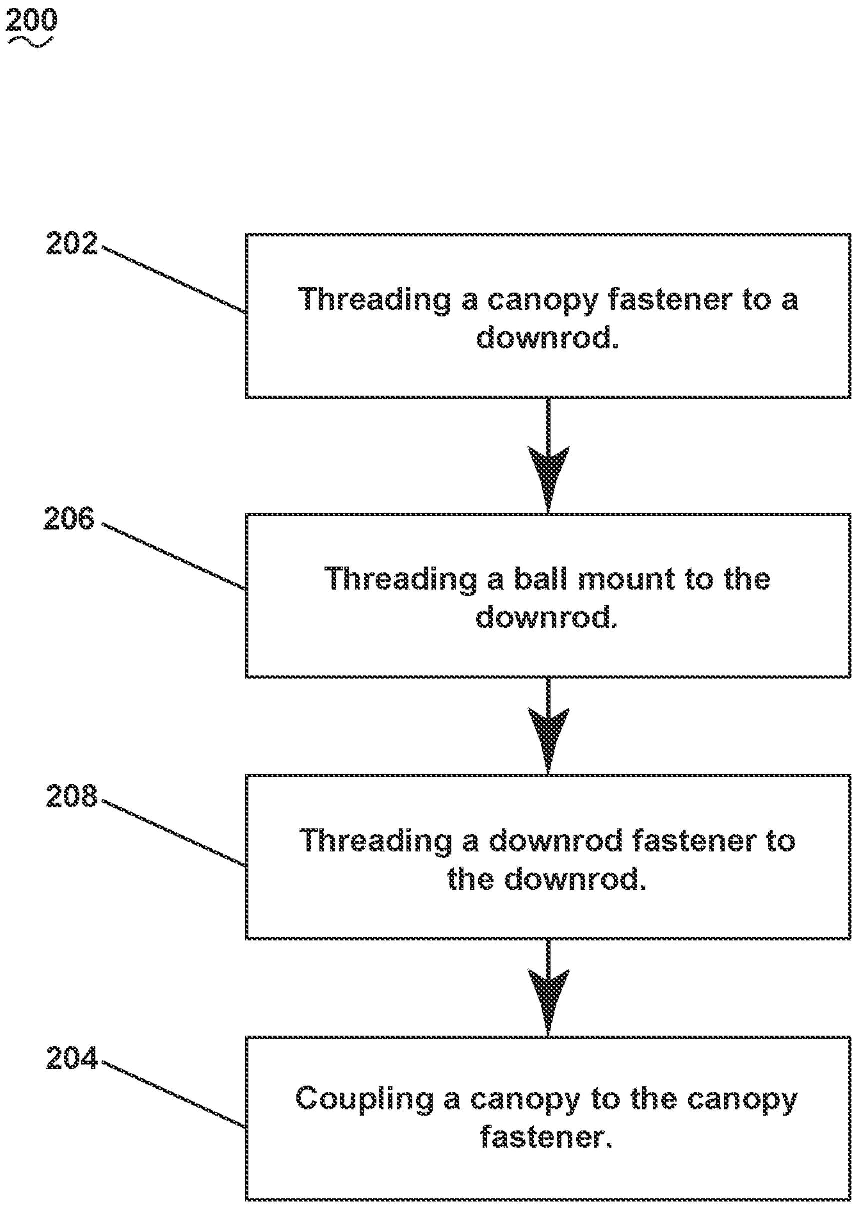
FIG. 6 is a flow chart illustrating a method of suspending a light from a structure.

FIG. 6 shows a flow chart illustrating a method 200 of suspending a light from a structure. The method 200 includes, at 202, threading the ball mount to the downrod, or alternatively, attaching a chain or other extension to the ball mount via mating electrical connectors. Such threading can include threading the canopy fastener 150 to the threaded portion 164 of the downrod 146. Furthermore, the threading can include threading an interior surface 170 of the canopy fastener 150 to the threaded portion 164 of the downrod 146.

At 204, the method 200 can include coupling the canopy 144 to the canopy fastener 150. Such coupling can include threading the canopy 144 to the canopy fastener 150, as well as threading the canopy 144 along the exterior surface 172 of the canopy fastener 150.

At 206, the method 200 can include threading the ball mount 148 to the downrod 146 along the threaded portion 164. The ball mount 148 can position behind the canopy fastener 150 securing the canopy fastener 150 in place. This can be done prior to coupling the canopy 144 to the canopy fastener 150 at 204.

At 208, the method can include threading the downrod fastener 154 to the downrod 146 along the threaded portion 164. The downrod fastener 154 can position behind the canopy fastener 150 and the ball mount 148, securing both to the downrod 146. This can also be done prior to coupling the canopy 144 to the canopy fastener 150 at 204, but should be done after the method 200 at 206 to secure the ball mount 148 and canopy fastener 150 behind the downrod fastener 154.

The mounting assembly 140 as described herein provides for simplified installation of a light, and facilitating user installation. The canopy fastener 150 provides simplified means to mount a canopy 144 in order to cover and hide a mount structure, like the hanger bracket 142. Such a simplified manner improves user experience during installation.

It should be further appreciated that the hanger bracket 142, similar to the hanger bracket 14 of FIG. 2, is primarily ornamental and was created for the purpose of ornamenting. The ornamental design thereof included significant decisions about how to present the hanger bracket 142 in the marketplace. While the hanger bracket 142 is intended to be hidden during its ultimate end use, the ornamental design is clearly intended to be noticed during the process of sale and noticed during installation of the hanger bracket 142. Such ornamenting provides that the article's design is a matter of concern, such as for as developing consumer recognition during the process of sale or during installation of the light including the hanger bracket 142, as well as enhancing saleable value and increasing consumer demand. Such ornamentality can be defined by one or more of the shape of the bracket, the pattern of openings, and the shape of the seat therein, as they contribute to the ornamental design as a whole.

It should be further appreciated that the mounting assembly as described herein permits the attachment of a canopy that does not bear the weight of the light assembly. More specifically, the canopy merely mounts to the hanger bracket to cover the hanger bracket, as opposed to bearing the weight of the light hung below. Removing the borne weight from the canopy facilitates installation of the canopy, as well as improving resiliency of the system, as the hanger bracket bears the weight, rather than the canopy.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Additional aspects are included in the following clauses:

A light assembly suspended from a structure to illuminate a space, the light assembly comprising: a hanger bracket; a downrod coupled to and suspended from the hanger bracket, the downrod including a threaded end; a light suspended from the downrod opposite the hanger bracket; a canopy fastener threaded to the threaded end of the downrod; and a canopy coupled to the canopy fastener.

The light assembly of any preceding clause wherein the canopy fastener includes an interior surface and an exterior surface.

The light assembly of any preceding clause wherein the interior surface of the canopy fastener threads to the threaded end of the downrod.

The light assembly of any preceding clause wherein the canopy threads to the exterior surface of the canopy fastener.

The light assembly of any preceding clause further comprising a ball mount.

The light assembly of any preceding clause wherein the ball mount fastens to the threaded end of the downrod.

The light assembly of any preceding clause further comprising a downrod fastener threaded to the threaded end of the downrod in serial arrangement behind the ball mount and the canopy fastener.

The light assembly of any preceding clause wherein the hanger bracket includes a seat to receive the ball mount.

The light assembly of any preceding clause further comprising a light coupled to the downrod opposite of the threaded end.

A kit for suspending a light from a structure, the kit comprising: a hanger bracket for mounting to the structure; a downrod for suspending the light from the hanger bracket, the downrod including a threaded end; a canopy fastener sized to thread to the threaded end of the downrod; and a canopy including a canopy opening sized to thread to the canopy fastener.

The kit of any preceding clause further comprising a ball mount threadable to the threaded end of the downrod.

The kit of any preceding clause wherein the hanger bracket includes a seat for seating the ball mount.

The kit of any preceding clause further comprising a downrod fastener for securing the canopy fastener to the downrod.

The kit of any preceding clause wherein the canopy fastener includes an interior surface and an exterior surface.

The kit of any preceding clause wherein the interior surface is threaded and sized to thread to the downrod at the threaded end.

The kit of any preceding clause wherein the exterior surface is sized to thread to the canopy opening.

A method of suspending a light from a structure with a mounting assembly, the method comprising: threading a canopy fastener to a threaded end of a downrod; and threading a canopy to the canopy fastener.

The method of any preceding clause wherein threading the canopy fastener to the downrod further includes threading an interior surface of the canopy fastener to the threaded end of the downrod.

The method of any preceding clause wherein threading the canopy to the canopy fastener further includes threading the canopy to an exterior surface of the canopy fastener.

The method of any preceding clause further comprising threading a ball mount to the threaded end of the downrod behind the canopy fastener.

The method of any preceding clause further comprising threading a downrod fastener to the threaded end of the downrod behind the ball mount.

What is claimed is:

1. A light assembly suspended from a structure to illuminate a space, the light assembly comprising:

- a ball mount having an internally threaded opening;
- a hanger bracket comprising:
  - a plate configured to mount to the structure, the plate having a face and a side edge;
  - a seat located below and depending from the face of the plate, wherein the seat is shaped to seat the ball mount; and
  - a mouth opening from the plate to the seat;
  - a downrod including opposing first and second ends, with the first end having an internally threaded receptacle;
  - a canopy having a face and a side wall;
- a set of fasteners securing the canopy to the hanger bracket;
- a light coupled to the second end of the downrod; and
- a threaded connector threaded into the internally threaded opening of the ball mount and threaded into the internally threaded receptacle.

2. The light assembly of claim 1 wherein the canopy includes a central opening sized to receive the downrod.

3. The light assembly of claim 2 wherein the central opening is sized to partially receive the ball mount.

4. The light assembly of claim 2, wherein the receptacle lies within the central opening of the of the canopy.

5. The light assembly of claim 4, wherein the downrod is a chain.

6. The light assembly of claim 5, wherein the receptacle is coupled to an end link of the chain.

7. The light assembly of claim 5, wherein the receptacle comprises a partial link of the chain.

8. The light assembly of claim 1 wherein each fastener of the set of fasteners is threaded.

9. The light assembly of claim 1 wherein the downrod is a chain.

10. The light assembly of claim 1 further comprising:

- a set of fastener openings formed in the plate and passing through the face;
- a set of fastener holes in the face of the canopy correspond with the set of fastener openings in the face of the plate to define corresponding pairs of fastener holes in the plate and the canopy; and
- a second set of fasteners passing through each of the pairs of fastener holes to secure the canopy to the plate of the hanger bracket while bypassing the seat.

11. The light assembly of claim 10 wherein each fastener of the second set of fasteners includes a first threaded end and a second threaded end, wherein the second threaded end is opposite the first threaded end.

12. The light assembly of claim 11 wherein the first threaded end is received by a hole of the set of fastener holes of the canopy and the second threaded end is received by an opening of the set of fastener openings of the hanger bracket.

13. The light assembly of claim 11 wherein the first threaded end is coupled to the hanger bracket via a bolt and the second threaded end is coupled to the canopy via a threaded cap.

14. A light suspension assembly for suspending a light from a structure to illuminate a space, the light suspension assembly comprising:

- a ball mount having a threaded opening;
- a hanger bracket having a plate configured to mount to a structure, a seat spaced below the plate, where an open mouth is formed between the plate and the seat, wherein the plate includes a set of fastener openings and the seat receives the ball mount;
- a chain including a threaded receptacle;
- a canopy sized to cover the hanger bracket and including a central opening sized to receive and circumscribe the receptacle, wherein the canopy includes a set of fastener holes;
- a set of fasteners received by the set of fastener holes and the set of fastener openings to couple the canopy to the plate; and
- a threaded connector threadedly connecting the receptacle to the ball mount.

15. The light suspension assembly of claim 14 further including a set of caps to fasten the canopy to the set of fasteners.

16. The light suspension assembly of claim 14 wherein each fastener of the set of fasteners includes a first threaded end and a second threaded end opposite the first threaded end.

17. The light suspension assembly of claim 16 wherein the first threaded end is received by a hole of the set of fastener holes of the canopy and the second threaded end is received by an opening of the set of fastener openings of the hanger bracket.

18. The light suspension assembly of claim 14 wherein the canopy includes a face and a sidewall, wherein the set of fastener holes are located at the face of the canopy.

19. A kit for suspending a light from a structure, the kit comprising:

a ball mount having an internally threaded opening;

a hanger bracket having a plate configured to mount to a structure and a seat spaced from the plate, the seat formed with and extending from the plate and shaped to seat the ball mount;

a downrod including a first end having an internally threaded receptacle; and a canopy sized to cover the hanger bracket and including a central opening sized to circumscribe the receptacle, the canopy comprising a face and a side wall, wherein the face of the canopy includes a set of fastener holes; and a threaded connector threaded into the internally threaded opening of the ball mount and threaded into the internally threaded receptacle.

20. The kit of claim 19 further comprising a set of fasteners that couple the face of the canopy and the to the plate of the hanger bracket.

21. The kit of claim 20 wherein each fastener of the set of fasteners includes a first threaded end and a second threaded end, wherein the second threaded end is opposite the first threaded end.

22. The kit of claim 21 wherein the first threaded end is received by a fastener hole of the set of fastener holes of the canopy and the second threaded end is received by a fastener opening of the set of fastener openings of the hanger bracket.

23. The kit of claim 19, wherein the downrod is a chain.

24. The light assembly of claim 23, wherein the receptacle is coupled to an end link of the chain.

25. The light assembly of claim 23, wherein the receptacle comprises a partial link of the chain.

26. A light assembly suspended from a structure to illuminate a space, the light assembly comprising:

a ball mount having a threaded opening;

a hanger bracket comprising:

a plate, the plate having a face with a set of fastener openings;

a seat spaced from the plate and depending from the face of the plate, wherein the seat is shaped to receive and seat the ball mount; and a mouth opening providing access to the seat for the ball mount;

a downrod including opposing first and second ends, with the first end comprising a threaded receptacle;

a canopy having a face and a side wall, wherein a set of fastener holes in the face of the canopy correspond with the set of fastener openings in the face of the plate to define corresponding pairs of fastener holes in the face of the plate and the face of the canopy;

a set of fasteners having a corresponding fastener for each of the corresponding pairs of fastener holes, wherein the corresponding fastener passes through the corresponding pair of fastener holes to secure the face of the canopy to the face of the plate;

a light coupled to the second end of the downrod; and a threaded connector threadedly coupling the threaded opening of the ball mount to the threaded receptacle.

* * * * *